(12) United States Patent
Noll et al.

(10) Patent No.: US 9,612,877 B1
(45) Date of Patent: Apr. 4, 2017

(54) HIGH PERFORMANCE COMPUTING IN A VIRTUALIZED ENVIRONMENT

(75) Inventors: Landon Curt Noll, Sunnyvale, CA (US); Claudio Desanti, Oakland, CA (US); Jeffrey M. Squyres, Louisville, KY (US); Aaron Fabbri, Portland, OR (US)

(73) Assignee: Cisco Technology, Inc., San Jose, CA (US)

( * ) Notice: Subject to any disclaimer, the term of this patent is extended or adjusted under 35 U.S.C. 154(b) by 985 days.

(21) Appl. No.: 13/547,300

(22) Filed: Jul. 12, 2012

(51) Int. Cl.
*G06F 9/50* (2006.01)
*H04L 12/46* (2006.01)

(52) U.S. Cl.
CPC ........ *G06F 9/5077* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 6,347,337 B1* | 2/2002 | Shah et al. | 709/224 |
| 8,028,071 B1* | 9/2011 | Mahalingam et al. | 709/227 |
| 8,102,881 B1* | 1/2012 | Vincent | 370/474 |
| 8,521,912 B2* | 8/2013 | Aloni et al. | 709/250 |
| 2004/0210623 A1* | 10/2004 | Hydrie et al. | 709/201 |
| 2005/0235092 A1 | 10/2005 | Ballew et al. | |
| 2006/0294234 A1 | 12/2006 | Bakke et al. | |
| 2007/0214308 A1* | 9/2007 | Pope et al. | 711/100 |
| 2010/0083237 A1* | 4/2010 | Kneebone et al. | 717/128 |
| 2010/0189206 A1* | 7/2010 | Kagan | 375/354 |
| 2011/0090910 A1* | 4/2011 | Tripathi et al. | 370/395.1 |
| 2011/0271062 A1* | 11/2011 | Chen | G06F 3/061 711/154 |
| 2013/0061047 A1* | 3/2013 | Sridharan et al. | 713/162 |

OTHER PUBLICATIONS

Unknown Author, Network Adapter Virtualization Design (Adapter-FEX) with Cisco Nexus 5500 Switches and Cisco Nexus 2232 Fabric Extenders Design Guide, Sep. 2011.*
Unknown Author, Improve Network Throughput by 38 Percent with the Cisco UCS M81KR Virtual Interface Card, Apr. 2010.*
Unknown Author, Managing Network Adapters, Feb. 2012.*
Unknown Author, White Paper: A Platform Built for Server Virtualization: Cisco Unified Computing System, 2009.*
Hazelhurst, "Scientific Computing Using Virtual High-Performance Computing: A Case Study using the Amazon Elastic Computing Cloud," The Proceedings of the South African Institute of Computer Scientists and Information Technologists (SAICSIT) Conference, 2008.

* cited by examiner

*Primary Examiner* — Lewis A Bullock, Jr.
*Assistant Examiner* — Kevin X Lu
(74) *Attorney, Agent, or Firm* — Edell, Shapiro & Finnan, LLC

(57) ABSTRACT

Double-bypass virtualization techniques are provided to enable use of high performance computing (HPC) application in a virtualized environment. In one example, a HPC user space application running on a virtual machine obtains direct access to virtual network interface card (vNIC) on a host-computing device associated to that virtual machine. The HPC user space application is configured to transmit and/or receive one or more data frames via the vNIC while bypassing the operating system of the virtual machine and the virtual machine hypervisor of the host-computing device.

18 Claims, 5 Drawing Sheets

HIGH PERFORMANCE COMPUTING IN A VIRTUALIZED ENVIRONMENT

TECHNICAL FIELD

The present disclosure relates to high performance computing (HPC).

BACKGROUND

Traditional HPC environments run with an operating system (OS) kernel that controls one or more central processing units (CPUs). Large HPC applications may span multiple OS kernels that, in turn, span multiple CPUs. Typically, only one HPC application is run at a time on a given CPU, and HPC schedulers control access to entire clusters of HPC computational resources (e.g., servers) and regulate which HPC jobs run on which servers and CPUs. These schedulers operate in a "batch" mode where HPC applications are slotted into various queues for execution. However, typically only the applications in the highest priority job queue are executed. If there are multiple applications in the highest priority job queue, the scheduler will switch between applications with a large batch time-slice that may take, for example, on order of several seconds, minutes, or hours.

DESCRIPTION OF EXAMPLE EMBODIMENTS

Overview

Figure 1:
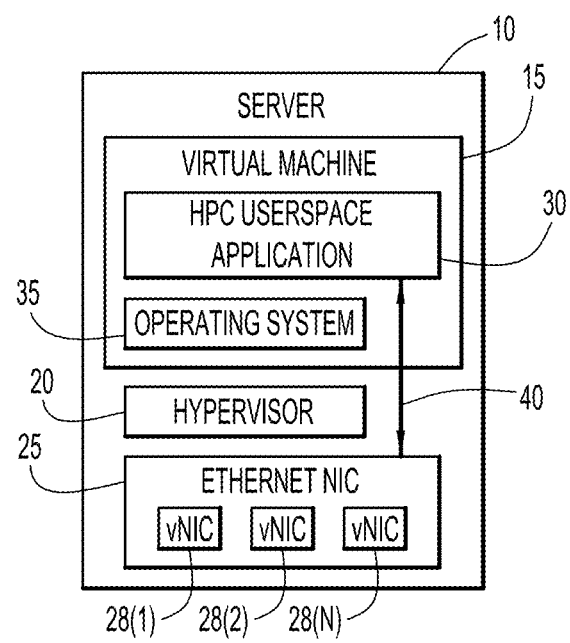
FIG. 1 is schematic diagram of a server in which double-bypass virtualization techniques are used to enable high performance computing (HPC) in a virtualized environment.

Double-bypass virtualization techniques are presented herein to enable deployment of high performance computing (HPC) applications in a virtualized environment. In one example, a HPC user space application running in a virtual machine obtains direct access to a virtual network interface card (vNIC) of the host-computing device associated to that virtual machine. The HPC user space application is configured to transmit and/or receive one or more data frames via the vNIC while bypassing the operating system of the virtual machine and the virtual machine hypervisor of the host-computing device.

Example Embodiments

High Performance Computing (HPC) is often characterized by computing systems used by scientists and engineers for modeling, simulating, and analyzing complex physical or algorithmic phenomena. HPC environments are evolving away from the monolithic mainframe or super-computer single tenant environments to environments wherein multiple HPC "tenants" each have separate HPC computing systems to service their specific needs. As used herein, a HPC tenant is a set of users who develop, test, tune and run (i.e., "share") a common set of HPC applications. In an organization, university departments, individual research projects, etc. may define tenants. In an organization such as a service bureau, a tenant may be defined as an individual customer.

With the emergence of cloud-computing, there is a trend towards re-centralization within multi-tenant organizations to, for example, simplify network and systems management and maintenance. However, running multiple HPC tenants in a single environment (i.e., the cloud) poses a number of challenges for traditional mechanisms. For example, in a single environment the tenants need to agree on a common operating system kernel and a common set of system libraries. The tenants also need to share the same file systems and segregation is enforced by access control. Additionally, the tenants generally need to use the same applications, particularly those of the system utility variety, and choose unique user and group identifiers. The HPC and kernel schedulers need to arbitrate competition for resources among tenants. For these and other reasons, the cloud-computing model has traditionally been viewed as impractical for HPC tenants. One conventional mechanism for multi-tenant HPC is to assign each tenant exclusive use of nodes within the shared system where the tenant is able to operate their HPC environment separate from the other tenants. However, this exclusive assignment approach is sub-optimal as it effectively segments the shared system and creates special cases for service provisioning. Moreover, the exclusive assignment of nodes makes resource sharing impractical and short-term urgent tasks cannot backfill into any unused nodes that have been exclusively assigned to a particular tenant.

Applying server virtualization techniques to a multi-tenant HPC environment is a solution to the shortcomings mentioned above, however, traditional virtualization is associated with an overhead and loss of performance that is considered unacceptable by most HPC users. As such, virtualization has not been widely deployed in HPC environments. Proposed herein are double-bypass virtualization techniques that significantly reduce the overhead and loss of performance of traditional virtualization techniques so as to make multi-tenant virtualized HPC environments practical. With these virtualization techniques, tenants may be assigned their own set of virtual machines running their preferred environment (operating system kernel, system libraries, file systems, applications, and user and group identifiers) and are not forced into the single environment that may be sub-optimal for a given HPC application, especially if they have legacy HPC applications that require the use of a legacy environment. Moreover, running HPC applications in a virtualized environment provides additional benefits such as elastic computation, fault resistance, and load balancing. Elastic computation is the ability to expand or contract the resources used by long running HPC applications based on external resource constraints and variable computational demands throughout the application lifetime. Fault resilience is useful, for example, when a hardware problem is identified by one of the virtual machines running as part of the HPC application. In such cases, the virtual machine running on a server that suffers a hardware problem may be migrated to another computation node. Load balancing improves performance since parts of the HPC computation may be migrated to underutilized computation nodes and away from computational nodes whose use would impede other aspects of the HPC calculation. In general, applying virtualization constructs (that have been developed to collapse multiple "one-server" computations over a reduced number of servers) to HPC computations (i.e., to massive parallel computations that in nature are not contained nor containable in a single server and that intrinsically require parallelism to be performed because no single processor/server can process them) leads to use of the virtualization constructs in a very different way from how they have been conceived (e.g., a typical case would be a single virtual server per physical server).

FIG. 1 is a block diagram of a server 10 configured to execute double-bypass virtualization techniques to enable use of a HPC application in a virtualized environment. Server 10 is configured to host a virtual machine 15 and comprises a virtual machine hypervisor 20 and network interface hardware 25. In this example, the network interface hardware 25 comprises an Ethernet network interface card (NIC) that connects server 10 to a computer network (not shown). As described below, the Ethernet NIC 25 is configured to support NIC virtualization resulting in multiple independent "virtual" NICs (vNICs) 28(1)-28(N). The network may comprise, for example, a high-speed local area network (LAN).

Computer operating systems generally segregate virtual memory into "kernel space" and "user space". Kernel space is strictly reserved for running the kernel, kernel extensions, and most device drivers. In contrast, user space is the memory area where user space processes are executed. A "process" is an executing (i.e., running) instance of an application/program. User space processes are instances of all applications other than the kernel (i.e., utilities and application programs). When an application is to be run, it is copied from storage into user space memory so that it can be accessed at high speed by a processor (e.g., central processing unit (CPU)). In the example of FIG. 1, virtual machine 15 executes a HPC user space application 30 under an operating system (OS) 35.

The hypervisor 20, sometimes referred to as a virtual machine manager, is a program that allows multiple operating systems to share a single physical host-computing device. Each operating system appears to have exclusive use of the host's processor, memory, and other resources. However, the hypervisor actually controls the host processor and resources, allocates what is needed by each operating system, and ensures that all of the operating systems cannot disrupt one another. In the example of FIG. 1, hypervisor 20 allows operating system 35 of virtual machine 15 to share the resources of server 10 with the operating systems of any other virtual machines (not shown in FIG. 1) hosted by server 10.

In a conventional arrangement in which a user space application is executed by a virtual machine, several steps need to be completed in order for the user space application to send/receive traffic via a computer network. With regard to transmission, the user space application first communicates with the network software stack (e.g., Transmission Control Protocol (TCP)/User Datagram Protocol (UDP) stack) of the virtual machine's operating system (i.e., the operating system of the virtual machine executing the user space application). Next, the network software stack of the operating system communicates with the network software stack of the hypervisor. The network software stack of the hypervisor then communicates with the network interface hardware. This process is reversed when traffic is received from the computer network. More specifically, the network interface hardware communicates with the network software stack of the hypervisor that then communicates with the network software stack of the virtual machine's operating system. Finally, the network software stack of the virtual machine's operating system communicates with the user space application.

In other words, in conventional arrangements, traffic between the user space application and the network are processed by both the operating system of the virtual machine as well as the hypervisor (i.e., network software stacks of the operating system and hypervisor). This virtualization process inherently includes overhead (e.g., latencies) that are generally unacceptable for HPC. The arrangement of FIG. 1 is configured to substantially reduce such virtualization overhead between HPC user space application 30 and the network. More specifically, server 10 (and the elements thereof) is configured to execute double-bypass virtualization such that traffic between the HPC user space application 30 and the network skips or bypasses both the network software stack of operating system 35 of virtual machine 15, and the network software stack of hypervisor 20. In other words, traffic between the HPC user space application 30 and another network-connected computing device is not processed by either the operating system 35 or the hypervisor 20. The double-bypass of operating system 35 and hypervisor 20 is represented by bi-directional arrow 40.

Bypassing the hypervisor and the operating system is performed with different methods. The bypass of the hypervisor may involve specific hardware support from the Ethernet NIC. In general, an Ethernet NIC is identified by a MAC address and performs transmission and reception of Ethernet frames through a hardware send queue (SQ), receive queue (RQ), and completion queue (CQ). In one example, hypervisor bypass may be supported when an Ethernet NIC is able to present multiple instances of its functionality on the Peripheral Component Interconnect (PCI) bus (not shown) of a server, thereby presenting "virtual" NICs (vNICs) on the PCI bus. Each vNIC is identified by its own PCI bus address (Bus, Device, Function 3-tuple) on the PCI bus and by its own MAC address. From a protocol perspective, a vNIC may be identified also by a vNIC Tag (e.g., VNTag or ETag, as specified by the Institute of Electrical and Electronics Engineers (IEEE) Std. 802.1BR), in addition to its MAC address. Each vNIC controls its own set of send queues (SQ), receive queues (RQ), and completion queues (CQ) in registered memory pages. These vNIC queues are properly multiplexed and demultiplexed by the physical NIC to access the physical media. For example, certain network interface hardware, such as the Cisco® Virtual Interface Card (VIC), is capable of presenting up to 256 virtual NICs to a PCI bus. Once the hypervisor detects that an Ethernet NIC supports virtual NICs, the hypervisor may associate one or more specific vNICs to a specific virtual machine, by assigning exclusive access of the vNICs' PCI bus addresses to that virtual machine. In this way frame processing is performed in hardware by the Ethernet NIC rather than in software by the hypervisor.

Bypassing the operating system by an HPC user application is instead performed in software by obtaining direct access to the vNIC through one or more bootstrapping procedures. Example bootstrapping procedures that may be executed by the HPC user space application 30 to obtain the direct access to a vNIC (e.g., vNIC 28(1)) of the Ethernet NIC 25 are described below with reference to FIG. 2. By obtaining direct access to the vNIC 28(1), the HPC user space application 30 obtains direct access to one set of the send queues (SQ), receive queues (RQ), and completion queues (CQ) controlled by vNIC 28(1).

Figure 2:
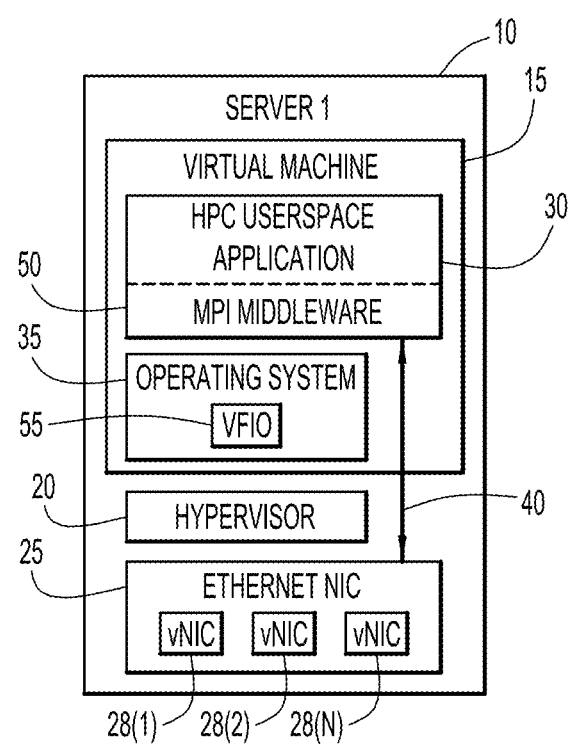
FIG. 2 is a schematic diagram of one example arrangement of the server of FIG. 1 for use of double-bypass virtualization techniques to enable HPC in a virtualized environment.

In the example of FIG. 2, when HPC user space application 30 transmits traffic to a destination via vNIC 28(1) of Ethernet NIC 25 (and the computer network), the HPC user application 30 does not use traditional sockets-based application programming interface commands (APIs) (e.g., send() or write() with a file descriptor). Rather, HPC user space application 30 creates one or more raw Layer 2 (L2) data frames in a selected memory location that is registered with that vNIC of the Ethernet NIC 25 (i.e., registered with the network interface hardware). In other words, the Ethernet NIC 25 is able to directly access this selected/registered memory location. The registration of the memory location occurs during the bootstrapping procedure(s). The creation of raw L2 data frames in registered memory may be performed by a function library such as the MPI middleware, rather than directly by the user code. The L2 frame created by the HPC user space application 30 may include, in certain examples, a source media access control address (MAC), a destination MAC address, an Ethertype, and payload data. The source MAC address may be an address associated with the vNIC 28(1) associated with HPC user space application 30 and the destination MAC address is the address associated with the destination computing device connected to the network, presumably with the vNIC associated with the HPC user space application communicating with HPC user space application 30. The L2 frame created by the HPC user space application 30 may include also additional protocol headers between the basic L2 header and the payload data, such as, for example, a VLAN Tag, an IP header, an UDP header, etc. In another example, the source/destination MAC may be placed in the frame by the hardware components.

By creating raw L2 data frames in registered memory, the HPC user space application 30 is able to trigger an event such that the actual frame-sending mechanics are offloaded directly to the Ethernet NIC 25. More specifically, placed in the registered memory location is the L2 frame (i.e., the frame that is to be transmitted to the destination computing device) and metadata associated with the L2 frame (e.g., metadata indicating that this is a send command, metadata indicating the length of the L2 frame to send, etc.). The 'event' is an access to this registered memory location and a pointer to this event is also placed in the send queue of the involved vNIC 28(1) of Ethernet NIC 25. Since vNIC 28(1) of Ethernet NIC 25 can directly read the registered memory location, the Ethernet NIC 25 can see the entire event, determine that this is a send command, obtain the entire L2 frame, etc. As such, the Ethernet NIC 25 can then perform the operations for transmission of the L2 frame to the destination.

When the Ethernet NIC 25 finishes transmission of the frame or sequence of frames constituting the transmitted traffic, the Ethernet NIC 25 will generate an event indicating that the transmission of the L2 frame was completed and will place this event in the completion queue of the involved vNIC 28(1). The HPC user space application 30, or the MPI middleware, may poll the completion queue and, after locating this event, determine that the L2 frame was successfully transmitted to the destination. As noted, execution of the above process over the vNIC 28(1) bypasses the operating system 35 and the hypervisor 20 to offload many of the sending operations to the Ethernet NIC 25, thereby reducing latency and increasing throughput.

On the receiving side, the Ethernet NIC 25 may use the specific vNIC MAC address or other information (such as a VNTag or ETag, or an IP address or an UDP port, etc.) to steer incoming frames directly to HPC user space application 30. When a vNIC is associated with only one HPC user application, the vNIC MAC address is sufficient to uniquely identify that HPC user application. This is the case in the example of FIG. 2 where vNIC 28(1) is associated with virtual machine 15 and only HPC user space application 30 is running. More specifically, HPC application 30 has a pre-posted buffer to receive incoming data frames. This buffer corresponds only to the HPC application 30, and is registered with the involved vNIC 28(1) of Ethernet NIC 25.

When a receive data frame directed to vNIC 28(1) arrives, the Ethernet NIC 25 uses the vNIC MAC address or other information (such as a VNTag or ETag, or an IP address or an UDP port, etc.) to determine if the frame is destined to HPC user application 30 and places the frame directly into the memory of the buffer that corresponds to the vNIC 28(1) associated with HPC user space application 30. The involved vNIC 28(1) then creates an event indicating that a receive data frame directed to HPC user space application 30 has arrived. The involved vNIC 28(1) then adds this event to the completion queue, and the event serves as an indication that an incoming frame is now residing in the buffer of HPC user space application 30. The HPC user space application 30 polls (periodically, continually, etc.) the completion queue to determine when such an event has been added to the completion queue. Once the HPC user space application 30 identifies an event indicating that a receive data frame is now residing in its corresponding buffer, the HPC user space application 30 retrieves the received data frame from the buffer. This processing may be performed also by the MPI middleware rather than by the user code. In this way, similar to the transmission of traffic, received traffic bypasses both the operating system 35 and hypervisor 20 by offloading most of the receiving mechanics to the Ethernet NIC 25, thereby driving down the latency.

The transmission/receipt of data frames described above significantly reduces the latency associated with conventional virtualization techniques by avoiding the entire TCP/UDP stack, kernel traps, etc. This improved performance provides the illusion of "bare metal" network speeds desired in HPC applications, even when running a HPC user space application in a virtual machine. More specifically, in a virtualized environment, the hypervisor typically acts a proxy for all network traffic. NICs are managed by the hypervisor and the virtual machines do not see the direct hardware, but rather only see NIC proxy software agents that operate like the hardware. In other words, when a frame is received on a NIC in a conventional arrangement, the hypervisor evaluates the information in the frame to determine to which virtual machine it is directed. In such arrangements, the hypervisor then passes the frame (via software) to the NIC proxy software agent in the target virtual machine. The NIC proxy software agent then passes the frame to the virtual machine operating system for forwarding to the user space application. This process is required in conventional arrangements because NICs are usually shared between multiple virtual machines. As such, the hypervisor operates as a network traffic switch that directs incoming traffic to the correct virtual machine.

FIG. 2 is a block diagram of server 10 and illustrating elements to perform an example bootstrapping procedure in which HPC user space application 30 obtains direct access to a vNIC of Ethernet NIC 25 (e.g., vNIC 28(1)). In this example, Message Passing Interface (MPI) user space middleware and Linux Virtual Function input Output (VFIO) are used to obtain the direct access. VFIO is a Linux kernel module that allows user space processes to communicate directly with PCI-based hardware. In this case, VFIO is used to obtain direct access to the send queue, receive queue, and completion queue and other hardware elements of the vNIC 28(1) of Ethernet NIC 25. The use of VFIO for the above bootstrapping procedure is merely one example and it is to be appreciated that other techniques may be alternatively executed for the HPC user space application 30 to obtain direct access to a vNIC of Ethernet NIC 25.

Figure 3:
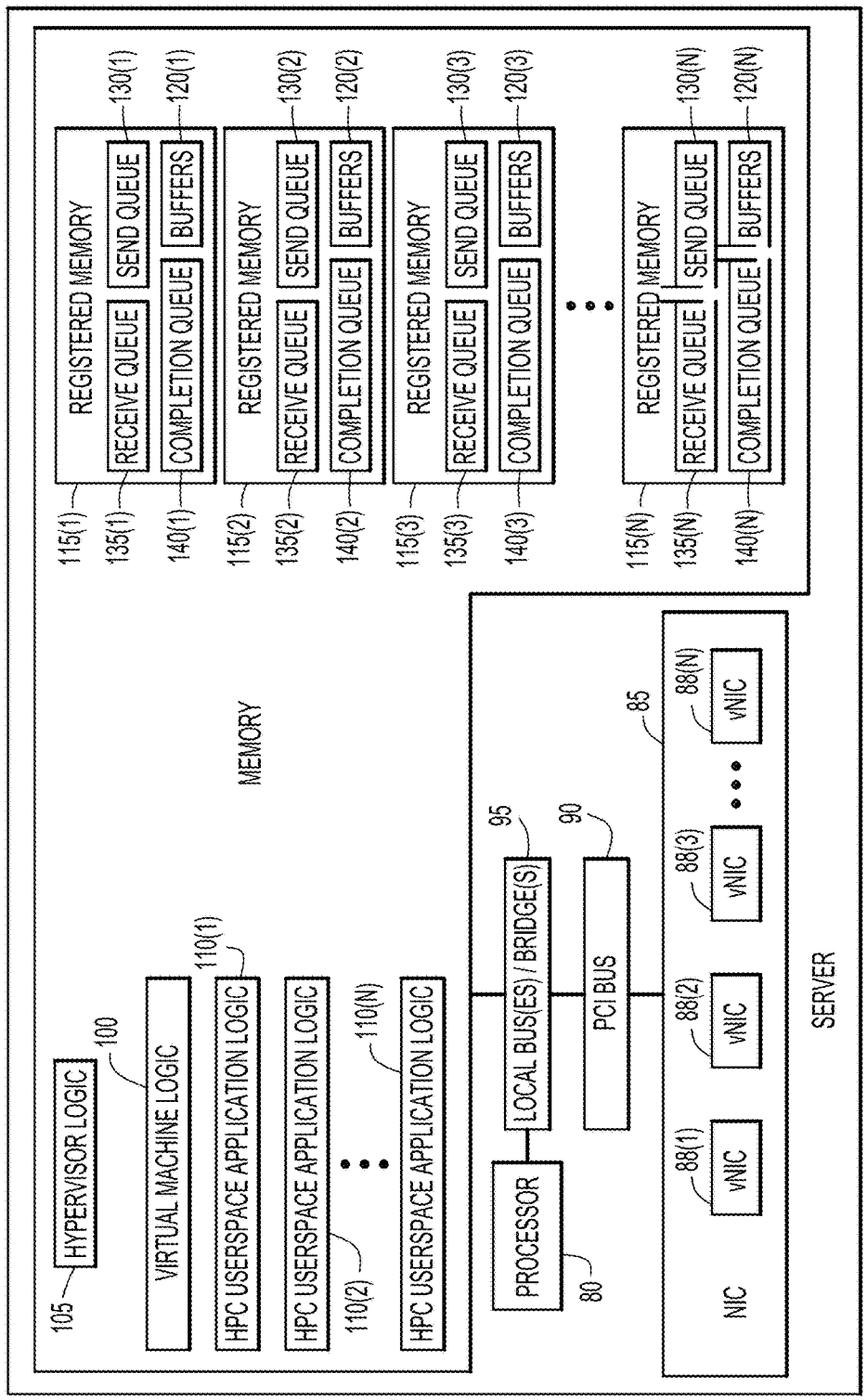
FIG. 3 is a block diagram of another server configured to use double-bypass virtualization techniques to enable HPC in a virtualized environment.

FIG. 3 is a block diagram of a server 70 configured to execute double-bypass virtualization techniques for use of HPC in a virtualized environment. Server 70 comprises a memory 75, a processor 80, and a network interface card (NIC) 85 (i.e., network interface hardware) supporting multiple "virtual" NICs (vNICs) 88(1)-88(N). Memory 75 includes virtual machine logic 100, hypervisor logic 105, HPC user space application logic 110(1), 110(2), and 110(3), registered locations 115(1), 115(2), 115(3) to 115(N). Registered locations 115(1)-115(N) include some buffers 120(1)-120(N), respectively, a send queue 130(1)-130(N), respectively, a receive queue 135(1)-135(N), respectively, and a completion queue 140(1)-140(N), respectively. NIC 85 is connected to a PCI bus 90 which is connected to processor 80 and memory 75 via one or more local bus(es)/bridge(s) 95.

Memory 75 may comprise read only memory (ROM), random access memory (RAM), magnetic disk storage media devices, optical storage media devices, flash memory devices, electrical, optical, or other physical/tangible memory storage devices. The processor 180 is, for example, a microprocessor or microcontroller that executes instructions for the logic 100, 105, and 110(1)-110(3). Thus, in general, the memory 75 may comprise one or more tangible (non-transitory) computer readable storage media (e.g., a memory device) encoded with software comprising computer executable instructions and when the software is executed (by the processor 80) it is operable to perform the operations described herein in connection with virtual machine logic 100, hypervisor logic 105, and HPC user space application logic 110(1)-110(3).

Virtual machine logic 100 is executable to provide virtual machines at server 70. These virtual machines may, in turn, execute HPC user space application logic 110(1), 110(2), and 110(3) to provide corresponding HPC applications (not shown in FIG. 3). For ease of reference, the virtual machines of the example of FIG. 3 will be referred to as virtual machines 100(1)-100(3). Also for ease of reference, the HPC user space applications of the example of FIG. 3 will be referred to as HPC user space applications 110(1), 110(2), and 110(3), each executed by one of the virtual machines 100(1)-100(3), respectively.

In the example of FIG. 3, the HPC user space applications 110(1), 110(2), and 110(3) are configured to communicate with one or more destinations (e.g., other HPC user space applications residing on other computing devices) via network interface card 85 and a network (not shown in FIG. 3) using double-bypass virtualization techniques described above with reference to FIG. 1. In the example of FIG. 3, in order to execute the double-bypass virtualization techniques, the various virtual machines 100(1), 100(2), and 100(3) are each independently and exclusively associated with a vNIC 88(1), 88(2), and 88(3), respectively. HPC user space applications 110(1), 110(2), and 110(3) executed by the virtual machines 100(1), 100(2), and 100(3) then each obtain direct access to a set of the various queues of their associated vNIC 88(1), 88(2), and 88(3), respectively. More specifically, HPC user space application 110(1) obtains access to send queue 130(1), receive queue 135(1), and completion queue 140(1) in registered memory 115(1) using one or more bootstrapping procedures. HPC user space application 110(2) obtains access to send queue 130(2), receive queue 135(2), and completion queue 140(2) in registered memory 115(2) using one or more bootstrapping procedures. Finally, HPC user space application 110(3) obtains access to send queue 130(3), receive queue 135(3), and completion queue 140(3) in registered memory 115(3) using one or more bootstrapping procedures.

In the example of FIG. 3, each HPC user space application 110(1), 110(2), and 110(3) is associated with a selected memory region that is registered with the appropriate vNIC of network interface card 85. These selected memory regions are represented in FIG. 3 by registered memory 115(1) (associated with HPC user space application 110(1)), registered memory 115(2) (associated with HPC user space application 110(2)), and registered memory 115(3) (associated with HPC user space application 110(3)). Each HPC user space application 110(1), 110(2), and 110(3) is also associated with a buffer 120(1), 120(2), and 120(3), respectively, within the respective registered memory location.

As described elsewhere herein, hypervisor bypass is enabled by exclusively associating one or more vNICs with a virtual machine. In other words, only that specific virtual machine can access the specific PCI bus address of that vNIC. Operating system bypass is enabled by providing a HPC application with direct access to a vNIC associated with the virtual machine executing the application. Direct access means that the HPC application can access one set of the send queues, receive queues and completion queues of that vNIC. Each vNIC may have multiple sets of these queues.

FIG. 3 illustrates a specific example in which each virtual machine runs one HPC application and is associated with only one vNIC. In this case, the MAC address of the vNIC is sufficient to identify the HPC application running on the virtual machine owning the vNIC with that address. However, it is to be appreciated that this is merely an example and that the techniques described herein may be executed in other arrangements.

More specifically, in another example each virtual machine may be associated with one vNIC, but is configured to run multiple HPC applications. In such examples, each HPC application can obtain direct access to a different set of send queues, receive queues, and completion queues of the vNIC associated with its virtual machine. Additionally, in these examples, the MAC address alone is not sufficient to identify the HPC application and additional protocol information (such as a VNTag or ETag, or an IP address or an UDP port, etc.) is needed.

In another example, each virtual machine may be associated with more than one vNIC and be configured to run multiple HPC applications. In this example, each HPC application can obtain direct access to a different set of send queues, receive queues, and completion queues of one of the vNICs associated with its virtual machine. Again, the MAC address alone is not sufficient enough to identify the HPC application and additional protocol information (such as a VNTag or ETag, or an IP address or an UDP port, etc.) is needed.

In a further example, the server may include multiple physical NICs. In such examples, a virtual machine may be associated with a vNIC on each physical NIC.

Figure 4:
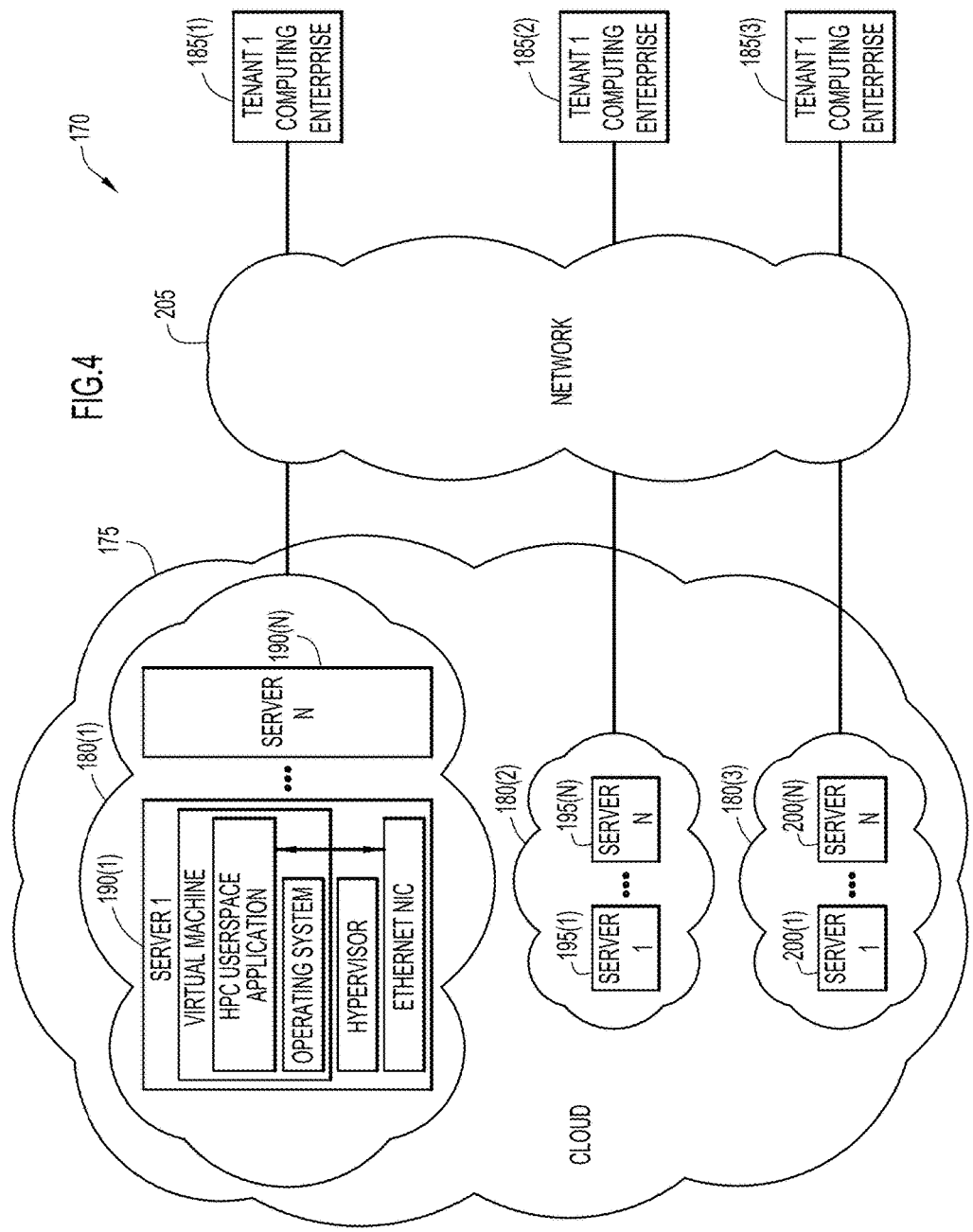
FIG. 4 is a schematic diagram of a multi-tenant cloud-computing system in which the servers are configured to use double-bypass virtualization techniques.

FIG. 4 is a schematic diagram of a multi-tenant cloud-computing system 170 that includes a cloud 175 that is operationally separated into several groups of servers 180(1), 180(2), and 180(3), each group associated with a specific tenant computing enterprise 185(1), 185(2), and 185(3), respectively. Server group 180(1) includes servers 190(1)-190(N), server group 180(2) includes servers 195(1)-195(N), and server group 180(3) includes servers 200(1)-200(N). Cloud 175 is connected to tenant computing enterprises 185(1)-185(3) via a network 205. Network 205 may be, for example, a high-speed local area network (LAN). In this example, the servers 190(1)-190(N), 195(1)-195(N), and 200(1)-200(N) are arranged substantially as described above with reference to FIG. 1 and are configured to use double-bypass virtualization techniques. As noted above, the use of the double-bypass virtualization techniques enables a reduced virtualization overhead that makes scheduling HPC jobs over virtual machines practical and effective, thereby resulting in various advantages in managing the resulting computing system.

Figure 5:
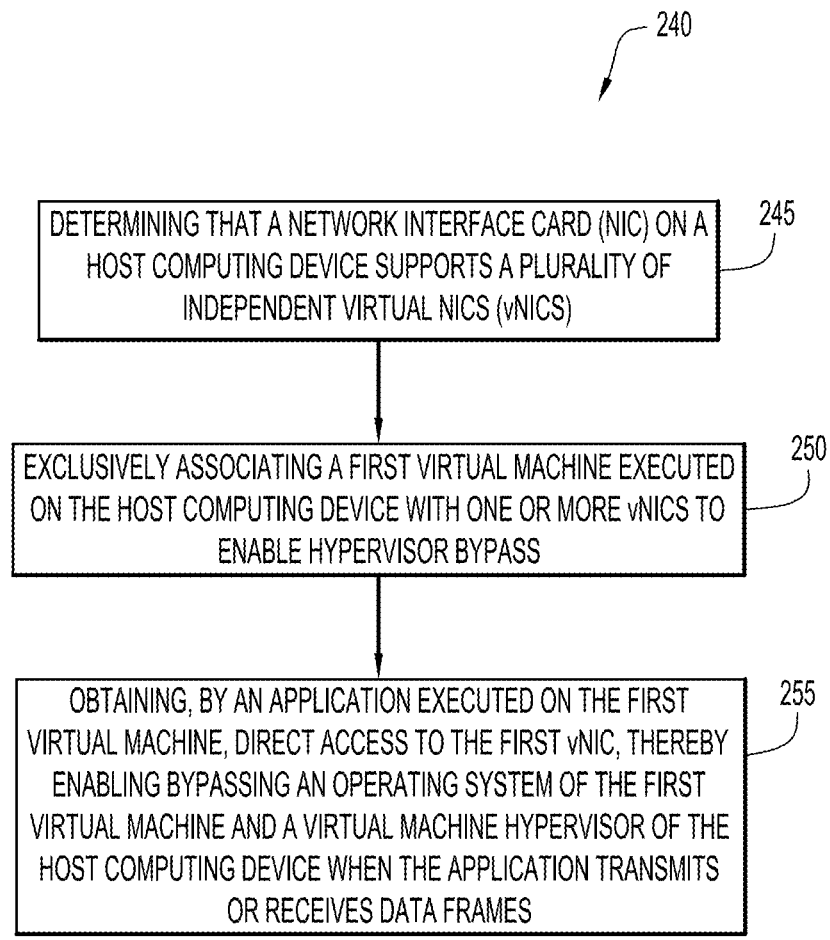
FIG. 5 is a flowchart illustrating a method executed in accordance with an example described herein.

FIG. 5 is a flowchart illustrating an example method 240 executed in accordance with the double-bypass virtualization techniques. Method 240 begins at 245 where it is determined that a network interface card (NIC) on a host-computing device supports a plurality of independent virtual NICs (vNICs). At 250, a first virtual machine executed on the host-computing device is exclusively associated with one or more vNICs to enable hypervisor bypass. At 255, an application executed on the first virtual machine obtains direct access to the first vNIC, thereby enabling bypassing an operating system of the first virtual machine and a virtual machine hypervisor of the host-computing device when the application transmits or receives data frames.

The above description is intended by way of example only.

What is claimed is:

1. A method comprising:
   determining that a physical network interface card (NIC) on a host computing device supports a plurality of independent virtual NICs (vNICs), wherein the physical NIC connects the host computing device to a computer network, wherein each vNIC is operable to provide independent communication over the computer network, and wherein the host computing device supports a plurality of virtual machines each configured to run one or more high performance computing (HPC) applications;
   exclusively associating each of the plurality of virtual machines with one or more vNICs on the physical NIC to enable hypervisor bypass;
   providing each HPC application executed on each of the plurality of virtual machines with direct access to a send queue, a receive queue, and a completion queue of one of the vNICs associated with the respective virtual machine to enable bypass of an operating system of the respective virtual machine and a virtual machine hypervisor of the host computing device when the corresponding HPC application transmits or receives frames; and
   by a first HPC application executed on a first one of the plurality of virtual machines, directly adding one or more data frames into a memory location registered with a first vNIC associated with the first virtual machine to trigger transmission of the one or more data frames on the computer network.

2. The method of claim 1, wherein the first HPC application is an HPC user space application, and wherein obtaining direct access to the first vNIC comprises:
   executing a bootstrapping procedure configured to allow the HPC user space application executed on the first virtual machine direct access to the send queue, the receive queue, and the completion queue of the first vNIC.

3. The method of claim 1, wherein each of the plurality of virtual machines is configured to run a plurality of HPC applications, and further comprising:
   associating each virtual machine with one vNIC; and
   obtaining, by each of the plurality of HPC applications executed on each virtual machine, direct access to a different set of send queues, receive queues, and completion queues of the vNIC associated with its virtual machine.

4. The method of claim 1, wherein each of the plurality of virtual machines is configured to run a plurality of HPC applications, and further comprising:
   associating each virtual machine with a plurality of vNICs; and
   obtaining, by each of the plurality of HPC applications executed on each virtual machine, direct access to a different set of send queues, receive queues, and completion queues of one of the vNICs associated with its virtual machine.

5. The method of claim 1, further comprising:
   in response to the addition of the one or more data frames in the memory location, adding a pointer to the send queue of the first vNIC;
   in response to placement of the pointer in the send queue of the first vNIC, directly reading, by the first vNIC, the one or more data frames from the memory location; and
   transmitting, by the first vNIC, the one or more data frames on the computer network.

6. The method of claim 1, further comprising:
   receiving, at the physical NIC, one or more receive data frames from the computer network directed to the application;
   placing the one or more receive data frames directly into a memory location corresponding to the first vNIC and associated with the application;
   creating, by the first vNIC, an event indicating receipt of the or more receive data frames;
   adding the event to the completion queue of the first vNIC;
   determining, by the application, that the event has been added to the completion queue of the first vNIC; and
   in response to detection of the event in the completion queue of the first vNIC, retrieving, by the application, the or more receive data frames from the memory location.

7. One or more non-transitory computer readable storage media encoded with software comprising computer executable instructions and when the software is executed operable to:
   determine that a physical network interface card (NIC) on a host computing device supports a plurality of independent virtual NICs (vNICs), wherein the physical NIC connects the host computing device to a computer network, wherein each vNIC is operable to provide independent communication over the computer network, and wherein the host computing device supports a plurality of virtual machines each configured to run one or more high performance computing (HPC) applications;

exclusively associate each of the plurality of virtual machines with one or more vNICs on the physical NIC to enable hypervisor bypass;

provide each HPC application executed on each of the plurality of virtual machines with direct access to a send queue, a receive queue, and a completion queue of one of the vNICs associated with the respective virtual machine to enable bypass of an operating system of the respective virtual machine and a virtual machine hypervisor of the host computing device when the corresponding HPC application transmits or receives data frames; and directly extract one or more data frames from a memory location corresponding to a first vNIC associated with a first virtual machine running a first HPC application, wherein the one or more data frames are added to the memory location upon receipt of the one or more data frames from the computer network at the physical NIC.

8. The non-transitory computer readable storage media of claim 7, wherein the first HPC application is an HPC user space application, and wherein the instructions operable to obtain direct access to the first vNIC comprise instructions operable to:

execute a bootstrapping procedure configured to allow the HPC user space application executed on the first virtual machine direct access to the send queue, the receive queue, and the completion queue of the first vNIC.

9. The non-transitory computer readable storage media of claim 7, wherein of the plurality of each virtual machines is configured to run a plurality of HPC applications, and further comprising instructions operable to:

associate each virtual machine with one vNIC; and obtain, by each of the plurality of HPC applications executed on each virtual machine, direct access to a different set of send queues, receive queues, and completion queues of the vNIC associated with its virtual machine.

10. The non-transitory computer readable storage media of claim 7, wherein each of the plurality of virtual machines is configured to run a plurality of HPC applications, and further comprising instructions operable to:

associate each virtual machine with a plurality of vNICs; and obtain, by each of the plurality of HPC applications executed on each virtual machine, direct access to a different set of send queues, receive queues, and completion queues of one of the vNICs associated with its virtual machine.

11. The non-transitory computer readable storage media of claim 7, further comprising instructions operable to:

create, by the application, one or more data frames in a memory location registered with the first vNIC to trigger addition of a pointer to the send queue of the first vNIC;

wherein in response to placement of the pointer in the send queue of the first vNIC, the first vNIC directly reads the one or more data frames from the memory location and transmits the one or more data frames on the computer network.

12. The non-transitory computer readable storage media of claim 7, wherein the first vNIC is configured to add, to the completion queue associated with the first vNIC, an event indicating receipt of the or more receive data frames, the computer readable storage media further comprising instructions operable to:

determine, by the application, that the event has been added to the completion queue of the first vNIC; and in response to detection of the event in the completion queue of the first vNIC, retrieve, by the application, the or more receive data frames from the memory location.

13. An apparatus comprising:

a memory;

a physical network interface card (NIC) configured to support a plurality of independent virtual NICs (vNICs), wherein the physical NIC connects the host computing device to a computer network, wherein each vNIC is operable to provide independent communication over the computer network, and wherein the host computing device supports a plurality of virtual machines each configured to run one or more high performance computing (HPC) applications;

one or more processors configured to:

exclusively associate each of the plurality of virtual machines with one or more vNICs on the physical NIC to enable hypervisor bypass; and provide each HPC application executed on each of the plurality of virtual machines with direct access to a send queue, a receive queue, and a completion queue of a first vNIC to enable bypass of an operating system of the first virtual machine and a virtual machine hypervisor of the apparatus when the application transmits or receives data frames;

execute a first HPC application on a first one of the plurality of virtual machines so as to directly add one or more data frames into a memory location registered with a first vNIC associated with the first virtual machine to trigger transmission of the one or more data frames on the computer network.

14. The apparatus of claim 13, wherein the first HPC application is an HPC user space application, and the one or more processors are configured to:

execute a bootstrapping procedure configured to allow the HPC user space application executed on the first virtual machine direct access to the send queue, the receive queue, and the completion queue of the first vNIC.

15. The apparatus of claim 13, wherein each of the plurality of virtual machines is configured to run a plurality of HPC applications, and the one or more processors are configured to:

associate each virtual machine with one vNIC; and obtain, by each of the plurality of HPC applications executed on each virtual machine, direct access to a different set of send queues, receive queues, and completion queues of the vNIC associated with its virtual machine.

16. The apparatus of claim 13, wherein each of the plurality of virtual machines is configured to run a plurality of HPC applications, and wherein the one or more processors are configured to:

associate each virtual machine with a plurality of vNICs; and obtain, by each of the plurality of HPC applications executed on each virtual machine, direct access to a different set of send queues, receive queues, and completion queues of one of the vNICs associated with its virtual machine.

17. The apparatus of claim 13, wherein the physical NIC is configured to:

in response to the creation of the one or more data frames in the memory location, add a pointer to the send queue of the first vNIC;

in response to placement of the pointer in the send queue of the first vNIC, directly obtain the one or more data frames from the memory location; and transmit the one or more data frames on the computer network.

18. The apparatus of claim 13, wherein the physical NIC is configured to:
place one or more receive data frames received at the physical NIC and directed to the application into a memory location corresponding to the first vNIC and associated with the application;
create an event indicating receipt of the or more receive data frames; and
add the event to the completion queue of the first vNIC;
wherein the one or more processors are configured to execute the application on the first virtual machine to:
determine that the event has been added to the completion queue of the first vNIC; and
in response to detection of the event in the completion queue of the first vNIC, retrieve the or more receive data frames from the memory location.

\* \* \* \* \*